Aug. 3, 1965    P. F. GOOD    3,198,271
TRAVELLING WEIGHT INDICATOR
Filed Oct. 16, 1963    7 Sheets-Sheet 1

INVENTOR
Paul F. Good
BY
Bailey, Stephens & Huettig
ATTORNEYS

Aug. 3, 1965

P. F. GOOD 3,198,271

TRAVELLING WEIGHT INDICATOR

Filed Oct. 16, 1963

INVENTOR
Paul F. Good

BY
Bailey, Stephens and Huettig
ATTORNEYS

Aug. 3, 1965 P. F. GOOD 3,198,271
TRAVELLING WEIGHT INDICATOR
Filed Oct. 16, 1963 7 Sheets-Sheet 3

INVENTOR
Paul F. Good
BY
Bailey, Stephens and Huettig
ATTORNEYS

Aug. 3, 1965   P. F. GOOD   3,198,271
TRAVELLING WEIGHT INDICATOR
Filed Oct. 16, 1963   7 Sheets-Sheet 7

INVENTOR
Paul F. Good
BY Bailey, Stephens and Huettig
ATTORNEYS

United States Patent Office 3,198,271
Patented Aug. 3, 1965

3,198,271
TRAVELLING WEIGHT INDICATOR
Paul F. Good, Lutherville, Md., assignor to Speedco, Inc., Baltimore, Md., a corporation of Maryland
Filed Oct. 16, 1963, Ser. No. 316,573
6 Claims. (Cl. 177—45)

This invention relates to a means for registering the weight of an article on a conveyor and having this weight indicated at the position of the article as the article is moved along by the conveyor. The invention is particularly directed to the transfer of processed meats which must have their weights corrected before they are packaged.

Processed meats, such as luncheon meats or bacon, are ordinarily first sliced, the slices gathered in groups, the groups or stacks weighed, and then placed on a conveyor where the weight of each off-weight stack must be corrected to be within an acceptable tolerance. The correction of the weights is a manual operation in which the stack of meat is lifted from the conveyor by an operator, placed on a scale, and then pieces of meat either added or removed by the operator before the stack is replaced upon the conveyor. Heretofore, this has required the use of a plurality of operators in order to handle the stream of stacks flowing rapidly from the slicing machine.

The object of this invention is to produce a means to facilitate the correcting of the weights of the stacks of meat by eliminating the need for lifting a stack of meat from the conveyor for the purpose of correcting the weight of the same, and further, to give a single operator access to a plurality of stacks which may or may not need their weight corrected.

In general, these and other objects of the invention are accomplished by constructing a conveyor with article advancing units and an indicator for each unit, which indicator travels along with its respective unit, and means responsive to an article weighing scale for setting the indicator at the measured weight of the article being advanced by its respective unit. Then as each article such as a stack of meat slices passes in front of an operator, the indicator will show whether the stack is over or underweight, and then the operator simply needs to either take off or add partial slices of meat in order to correct the weight of the stack without removing the stack from the conveyor. The apparatus is such that the operator can have a plurality of indicators in view and thus can walk along with the conveyor to keep up with the correction of a run of meat stacks of unacceptable weight.

The means by which the objects of the invention are obtained are described more fully with reference to the accompanying drawings in which.

Figure 1:
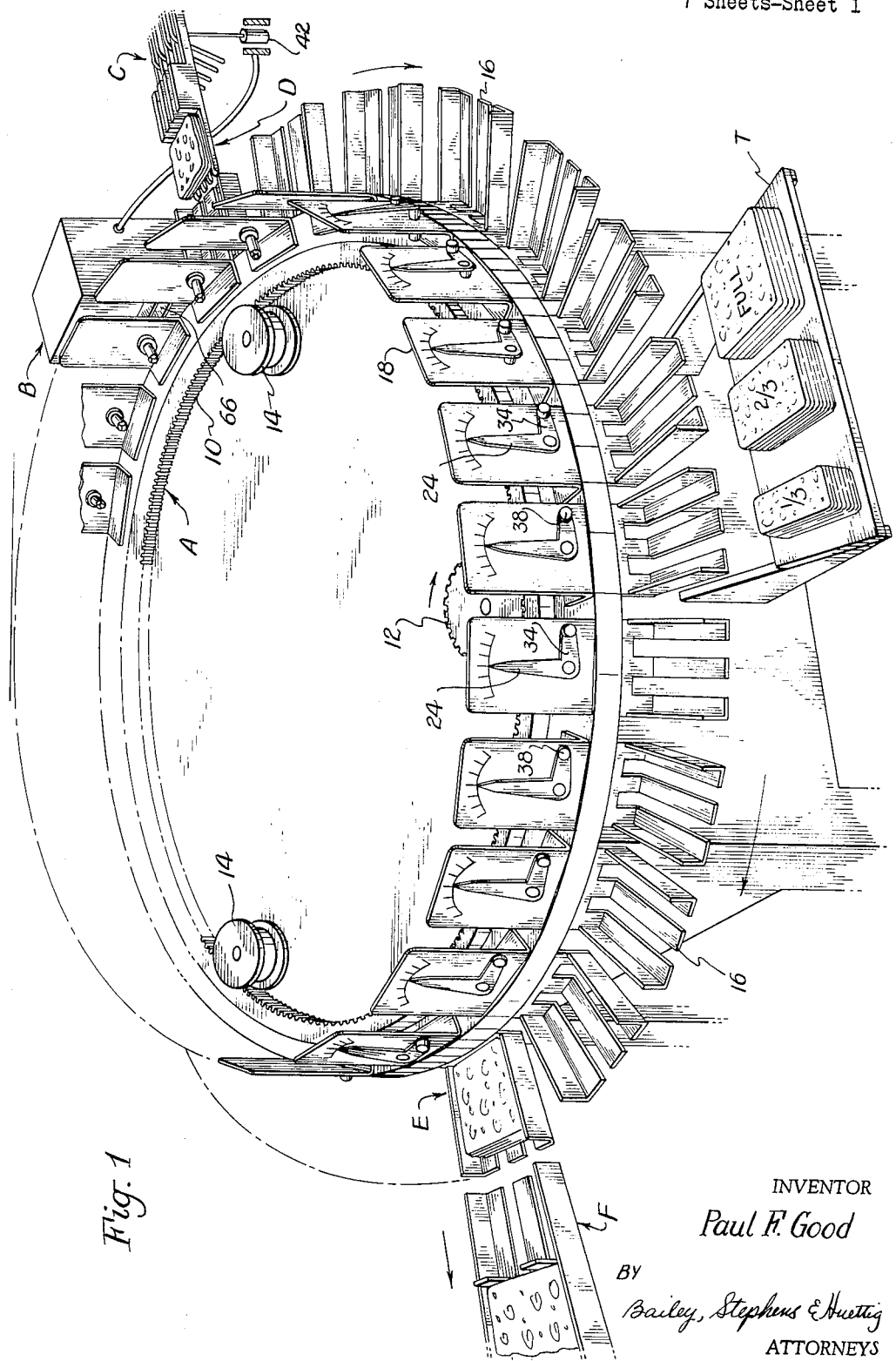
FIGURE 1 is a perspective view of a circular conveyor according to this invention.

As shown in FIGURE 1, the apparatus of this invention is composed of a circular conveyor A and indicator setting mechanism B which is responsive to a scale C. For purposes of illustration, this scale is the same as that shown in the patent to Good, No. 2,989,104. Again, as shown in said patent, after the meat has been weighed, it is picked off the scale by a rack D and advanced to another conveyor.

In this invention, the conveyor A of FIGURE 1 is composed of a ring gear 10 driven by a pinion 12 and positioned by guide rollers 14. On the outer circumference of the ring gear are mounted the plurality of finger rack article advancing units 16, some twenty-four of these advancing units being indicated in FIGURE 1. The rack transferring the article, such as a stack of meat, from the scale C deposits the article on an advancing unit 16.

Conveyor A has mounted thereon an indicator 18 for each advancing unit 16. As shown in detail in FIGURE 2, this indicator is composed of a scale plate 20 secured by bolt 22 to conveyor A. A pointer 24 is secured to a shaft 26 mounted in a bushing 28 extending through plate 18. A leaf spring 30 at one end of shaft 26 is tightened by a nut 32 to hold pointer 24 in any given position. A lever 34, FIGURE 1, is joined at an angle to pointer 24. At the free end of this lever is secured a roller 38.

Figure 3:
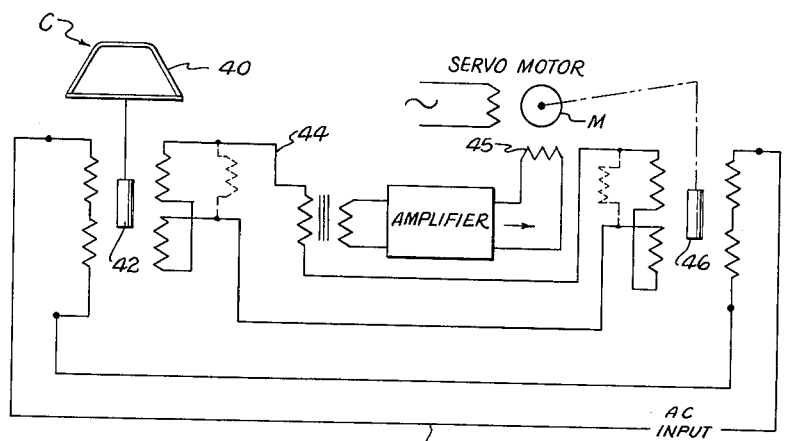
FIGURE 3 is a schematic view of the electrical system for setting the indicator on the conveyor in response to a weighing scale.
Figure 4:
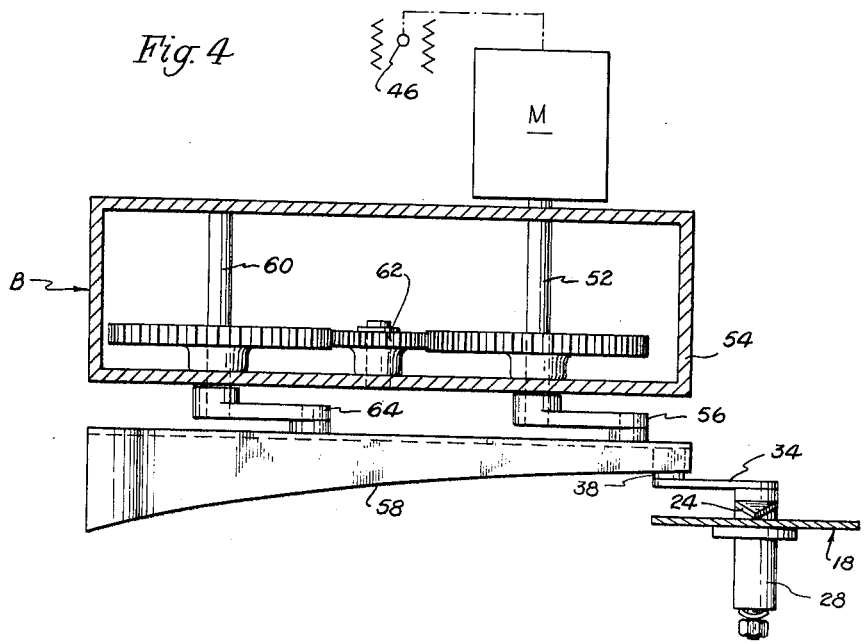
FIGURE 4 is a plan view of the indicator setting mechanism taken on the line 4—4 of FIGURE 5.
Figure 5:
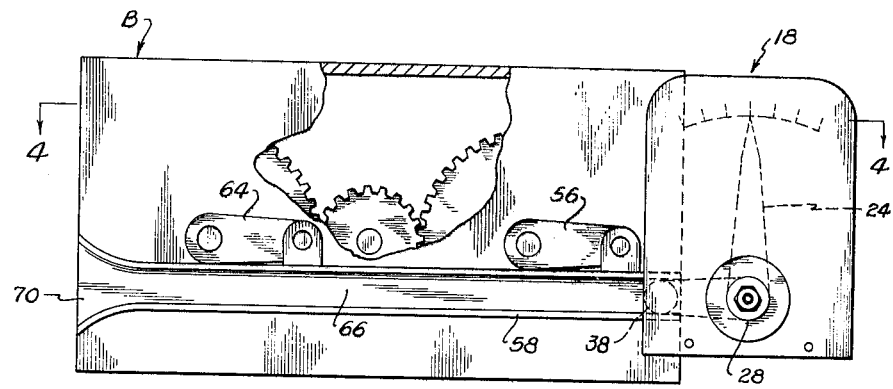
FIGURE 5 is a front view of FIGURE 4 partly cut away.

The indicator setting mechanism is shown in FIGURES 3, 4 and 5. As seen in the electrical schematic of FIGURE 3, the weighing scale C has a platform 40 from which is hung the armature 42 of a first solenoid forming a part of a servo mechanism. An armature 46 of a second solenoid is connected to the servo motor mechanism. These armatures 42 and 46 are electrically connected by lines 44 and 44a such that, during the weighing cycle, winding 45 is energized and the output shaft of motor M rotates in response to the linear displacement of armature 42. The motor M continues to run until the mechanically connected armature 46 has travelled to a position corresponding to the position of armature 42. At this point, the secondary output currents of the two solenoids are in balance and the current flow to the motor M reduces to zero to stop its rotation. If the armature 42 is displaced in an opposite direction, the motor will rotate in the opposite direction until the electrical balance is again reached. This servo mechanism is that described in Bulletin 6171, dated February 1961, published by the Automatic Timing & Controls, Inc., Servo Mechanism, Class 6171-D. As shown in FIGURES 4 and 5, the motor M drives a shaft 52 which extends through the housing 54 and to the end of which is fixed a lever 56 pivotally connected to an outwardly opened channel 58 which serves as an indicator setting groove. Shaft 60 journalled in housing 54 is driven at the same speed and direction as shaft 52 by means of a gear train 62. Shaft 60 likewise has a lever 64 similar to lever 56 and is pivotally attached to channel 58.

Figure 2:
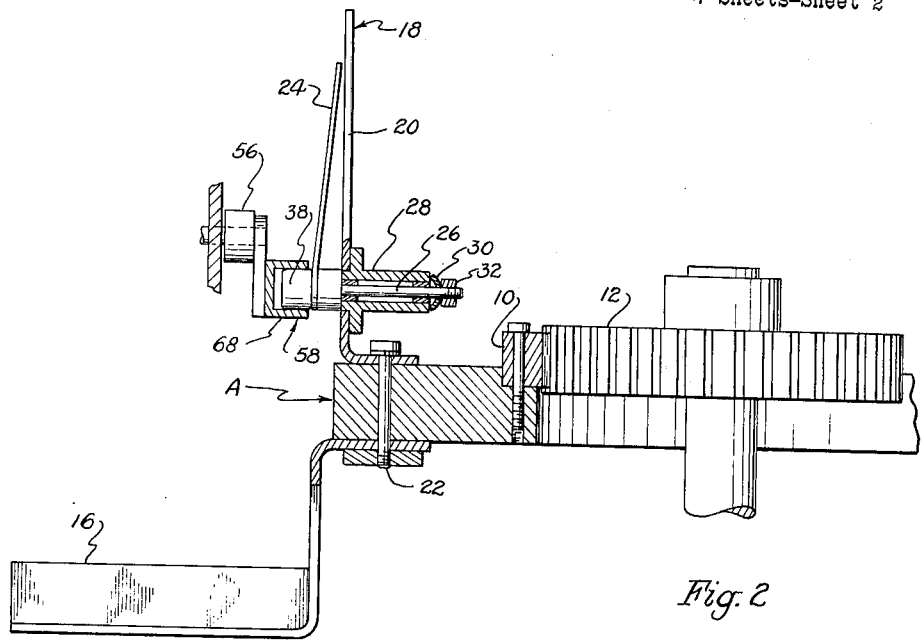
FIGURE 2 is an enlarged cross-sectional view through a portion of the conveyor of FIGURE 1.

Rotation of shaft 52 in response to a movement of the weight scale platform will thus produce a movement of channel 58 parallel to itself. Channel 58 is composed of a web 66, FIGURE 5, extending between side flanges 68, FIGURE 2, which flanges are flared outwardly at the inlet end 70 of the channel as shown in FIGURES 2, 4 and 5. When the roller 38 on the end of lever 34 approaches the inlet end 70 of channel 58, it is guided into the channel by the flared flanges and moved to the existing position of channel 58 so as to move the pointer 24 and thus indicate the weight of the article as has been measured by the scale C.

In the operation of the circular conveyor of FIGURE 1, the conveyor is indexed in time with the movements of the rack D working with scale C. The indicator setting mechanism is located at least one advancing unit position in advance of the rack. Consequently, each pointer 24 is pre-set to the weight of the article before the article is actually deposited upon that particular advancing unit 16.

As the conveyor rotates clockwise in FIGURE 1, each indicator becomes visible to the operator and the pointer 24 will show whether the article is of acceptable weight or whether it is over- or underweight. This greatly facilitates the correction of the weights of the articles such as stacks of luncheon meat slices. For example, a tray T can be placed adjacent the conveyor and loaded with different types of meat, sausage, etc., such as a full slice, a two-thirds slice, or a one-third slice. Then the operator can simply add or remove a full or partial slice from the stack to bring it to the correct weight. At the same time, the operator can then manually position the pointer 24 to central position, or this can be done at a latter station by automatic means. The articles are then successively conveyed to an ejector E for transfer to a conveyor F leading to a packaging machine.

Because the conveyor A is indexed and therefor intermittently moved, the roller 38 is engaged in channel 58 during the indexing and the weighing cycle and sets the pointer 24 to the weight of the article. The power to the servo motor is cut off at the end of the weighing cycle and remains off until the moving conveyor takes the roller 38 out of channel 58. Then the power to the servo motor is turned on to follow the return of the scale platform to its neutral position. The indexing starts shortly before and stops shortly after the weighing cycle.

Figure 6:
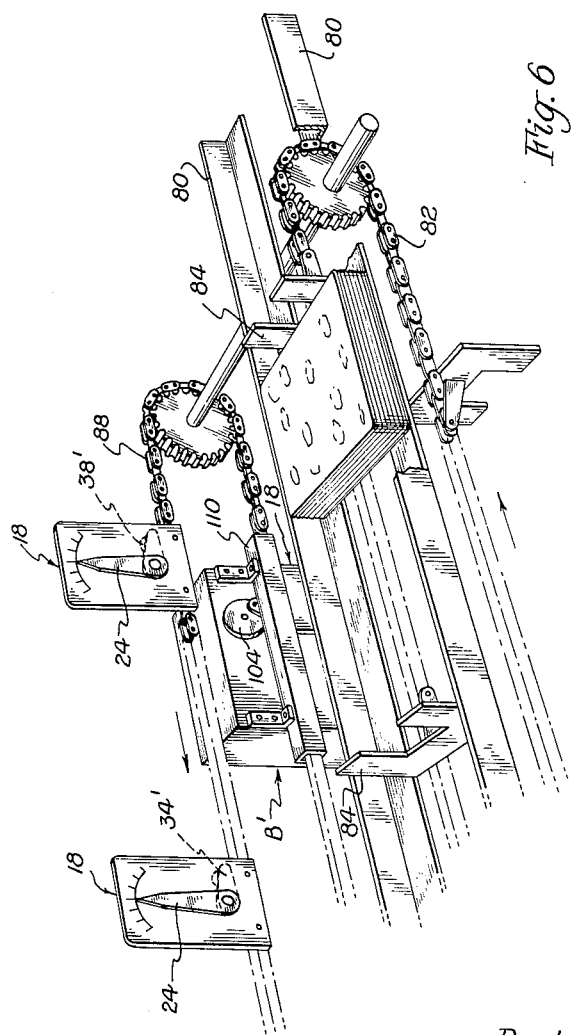
FIGURE 6 is a perspective view of a modification of FIGURE 1 and showing an endless chain linear conveyor.
Figure 7:
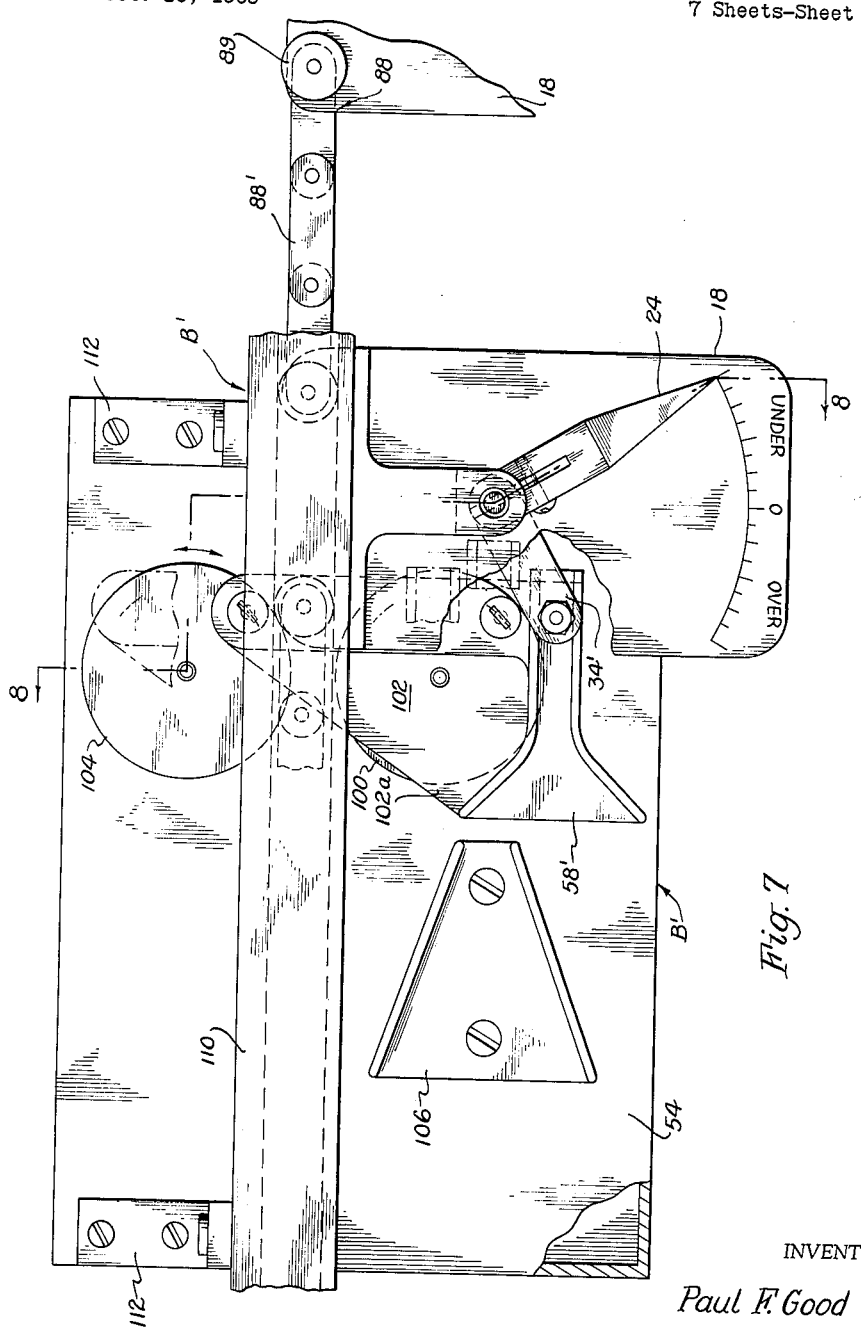
FIGURE 7 is an enlarged front view of the indicator mechanism shown in FIGURE 6.
Figure 8:
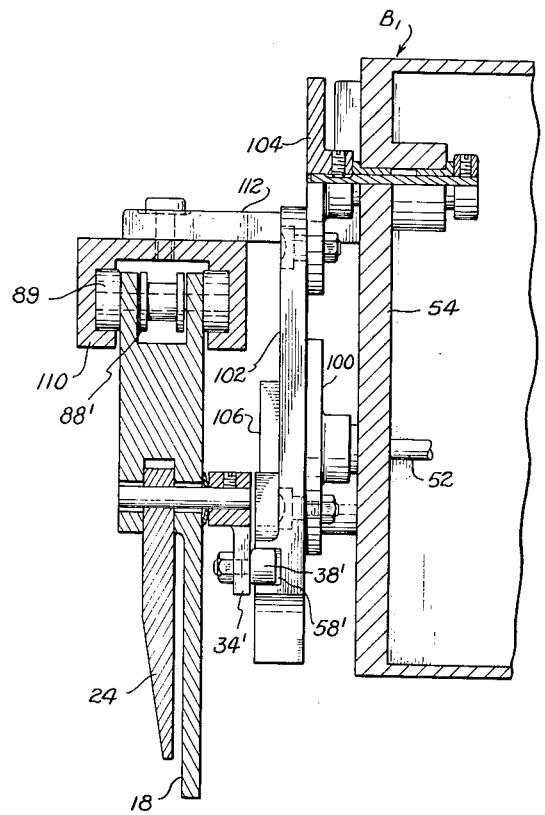
FIGURE 8 is a cross-sectional view taken on the line 8—8 of FIGURE 7.

In the modification of FIGURES 6, 7 and 8, the principle of this invention is shown applied to a linear moving endless belt conveyor. The article coming from the rack D is deposited upon a pair of angle tracks 80. An endless conveyor chain 82 moves advancing units 84, in this case flights, connected to the chains. It is apparent that this chain must be driven in synchronism with the movement of the rack, and which chain movement may be either continuous or intermittent.

The scale plate 18 is joined to a separate endless chain 88 driven by a shaft common to chain 82. Chain 88 is composed of links 88' and guide rollers 89. However, the pointer 24 is connected to a lever 34' on the backside of the indicator and carries a roller 38'. Plates 18 are inverted while being held on the lower reach of chain 88 and as they pass the indicator setting mechanism B'.

The modified indicator setter shown in FIGURES 7 and 8 is composed of a disc 100 secured to the end of and turnable by a servo motor shaft 52. A link 102 is connected by pivot pins to disc 100 and a second disc 104, the latter being freely rotatably mounted on the wall of housing 54. Link 102 is extended by a triangular web 102a and includes an indicator setting channel 58' along its lower horizontal edge. As shaft 52 is turned, link 102 is lifted or lowered vertically in accordance with the position of the scale C. Channel 58' moves parallel to itself. The longitudinal displacement of the channel due to the turning of the discs is of no significance. In FIGURE 7, channel 58' is shown in its extreme underweight position. The extreme overweight position is indicated by dashed lines at the top of the figure.

A triangular pre-aligning shoe 106 fastened to housing 54 guides roller 38' to bring pointer 24 into approximately neutral position before the roller reaches channel 58'.

A chain guide track channel 110 is secured to housing 54 by brackets 112. As chain 88 advances toward and through channel 110, the guide rollers 89 engage the channel flanges and keep the chain from sagging and thus preventing an inaccurate setting of pointer 24.

In operation, when the scale platform is depressed by the article being weighed, channel 58' assumes a corresponding position. The servo motor is then stopped, and channel 58' remains stationary. Roller 38' then advances through pre-aligning shoe 106, and all the way through stationary channel 58' to set pointer 24 to the indicated weight of the article. Then after the rack D has removed the article from the scale, the servo motor is again energized for another weighing cycle for a following article. When the plate 18 is turned upright on the upper reach of chain 88, it takes a position aligned with the advancing unit 84, and retains this position as long as the article remains on the conveyor.

The indicator setting mechanism B', with minor physical changes, can be substituted for the mechanism B in the circular conveyor of FIGURE 1. It would maintain the same function.

Figure 9:
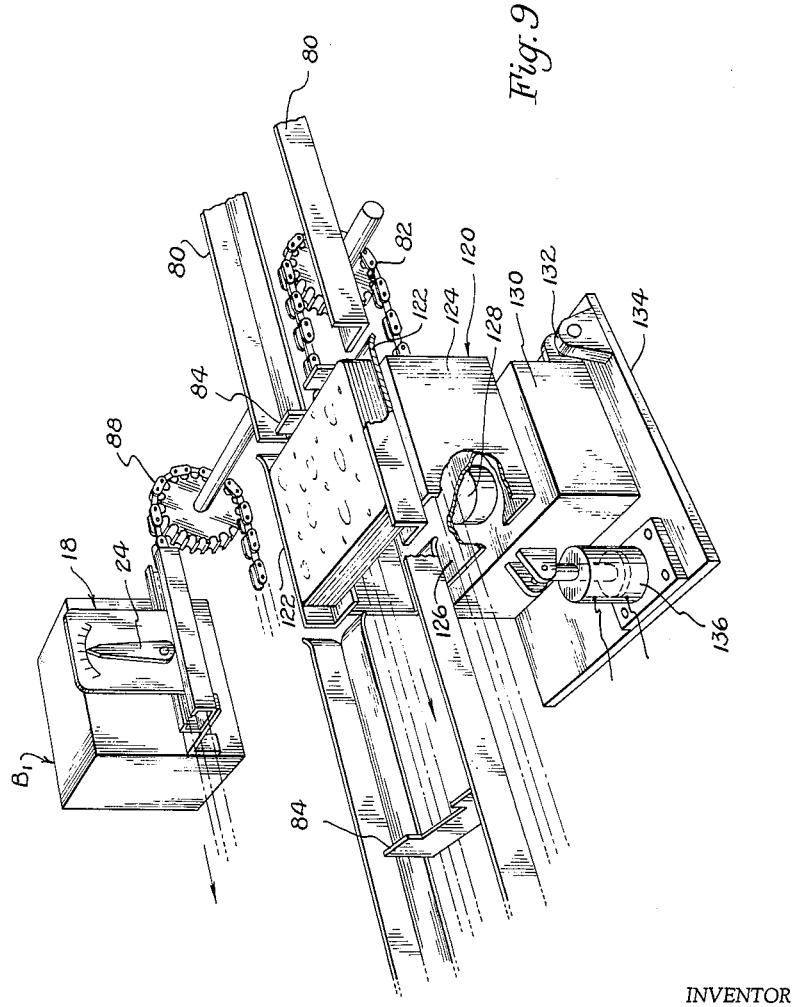
FIGURE 9 is a perspective view of a further modification of the invention.

In the modification of FIGURE 9, the weighing scale is shown applied to the linear conveyor of FIGURE 6. The article is placed on the tracks 80 by any suitable means and including the rack D. The rails, however, are interrupted so that a scale platform 120 can be placed in line with the tracks. This platform is composed of a pair of scale tracks 122 secured to the top of a channel-shaped member 124 which has a web 126 joined to a post 128 which, in turn, is attached to the scale beam. The housing 130 for the scale beam is connected by hinges 132 to a base 134. Opposite the hinged side of the housing is a short-stroke, double-acting air piston or solenoid 136 extending between the base 134 and housing 130 so that the housing can be swung upwardly or downwardly.

As the article is being moved on the tracks 80, as indicated, by being pushed by the flights 84, it reaches the scale rails 122 whereupon the flights are momentarily stopped. The article must be disengaged from contact with the flights before it can be accurately weighed. This is done by actuating the piston 136 so that the lefthand side of the platform 128 is lowered slightly. This small movement is sufficient to tilt the article away from engagement with the flight 84 and thus free the article so that it can be weighed. The measured weight of the article is then transmitted to the indicator setting mechanism B' essentially as described for FIGURE 6.

Having now described the means by which the objects of the invention are obtained,

I claim:

1. An apparatus for weighing and forwarding an article along with an indicator showing the weight of the article comprising a single weighing means for measuring the weight of the article, a conveyor adjacent said weighing means for receiving articles and having article advancing units, an indicator at each said advancing unit and movable in position therewith, and indicator setting means adjacent said conveyor and responsive to said weighing means for automatically setting said indicators to show the measured weight of said article for each article as the article advancing units and indicators pass by the weighing means and during its travel with said advancing unit along said conveyor.

2. An apparatus as in claim 1, said conveyor being circular, and said indicator and said advancing unit being mounted on said conveyor and carried thereby.

3. An apparatus as in claim 1, said indicator comprising a scale plate, a pointer pivotally mounted on said scale plate, and a lever joined to said pointer and engageable with said indicator setting means for pivoting said pointer.

4. An apparatus as in claim 3, further comprising means for transferring said articles from said weighing means to said conveyor, and said indicator setting means being positioned in advance of said means for transferring said article to said conveyor for presetting said indicator before said article is received by said conveyor.

5. An apparatus as in claim 1, said conveyor comprising an endless linear chain conveyor carrying, said advancing units.

6. An apparatus as in claim 1, said conveyor comprising a linear conveyor with flights forming the article advancing unit, said weighing means comprising a scale platform in line with said conveyor, and means for tilting said platform for disengaging an article from its flight while said article is being weighed.

References Cited by the Examiner

UNITED STATES PATENTS

| | | | |
|---|---|---|---|
| 2,515,412 | 7/50 | Lee | 177—12 |
| 2,763,109 | 9/56 | Baker | 53—135 |
| 3,108,647 | 10/63 | Harmon et al. | 177—1 |

LEYLAND M. MARTIN, *Primary Examiner.*